(12) United States Patent
Park et al.

(10) Patent No.: US 6,690,374 B2
(45) Date of Patent: Feb. 10, 2004

(54) SECURITY CAMERA SYSTEM FOR TRACKING MOVING OBJECTS IN BOTH FORWARD AND REVERSE DIRECTIONS

(75) Inventors: Michael C. Park, Portland, OR (US); Gwendolyn Hunt, Portland, OR (US); G. David Ripley, Portland, OR (US)

(73) Assignee: iMove, Inc., Portland, OR (US)

( * ) Notice: Subject to any disclaimer, the term of this patent is extended or adjusted under 35 U.S.C. 154(b) by 0 days.

(21) Appl. No.: 10/228,541

(22) Filed: Aug. 27, 2002

(65) Prior Publication Data

US 2002/0196330 A1 Dec. 26, 2002

Related U.S. Application Data

(63) Continuation-in-part of application No. 10/003,399, filed on Oct. 22, 2001, which is a continuation of application No. 09/310,715, filed on May 12, 1999, now Pat. No. 6,337,683, application No. 10/228,541, which is a continuation-in-part of application No. 10/136,659, filed on Apr. 30, 2002, which is a continuation-in-part of application No. 09/994,081, filed on Nov. 23, 2001, now abandoned, and a continuation-in-part of application No. 09/992,090, filed on Nov. 16, 2001, now abandoned.

(60) Provisional application No. 60/381,445, filed on May 17, 2002, and provisional application No. 60/343,405, filed on Oct. 19, 2001.

(51) Int. Cl.[7] .............................................. G06T 15/20

(52) U.S. Cl. ....................... 345/427; 348/143; 348/159; 348/169; 348/218.1

(58) Field of Search ................................. 345/629, 474, 345/418, 660, 427; 348/36, 38, 39, 42, 143, 159, 169, 218.1, 383; 141/94

(56) References Cited

U.S. PATENT DOCUMENTS 3,909,121 A    9/1975   Cardoso
4,807,158 A    2/1989   Blanton et al.
4,853,764 A    8/1989   Sutter
5,023,725 A    6/1991   McCutchen
5,130,794 A    7/1992   Ritchey
5,235,198 A    8/1993   Stevens
5,329,616 A    7/1994   Silverbrook
5,355,450 A    10/1994  Garmon
5,495,576 A    2/1996   Ritchey
5,541,773 A    7/1996   Kamo
5,563,649 A    10/1996  Gould et al.
5,650,814 A    7/1997   Florent et al.
5,657,073 A    8/1997   Henley
5,677,981 A    10/1997  Kato
5,684,937 A    11/1997  Oxaal
5,703,604 A    12/1997  McCutchen
5,708,469 A    1/1998   Herzberg (List continued on next page.)

OTHER PUBLICATIONS

"The Quicktime VR Book—Creating Immersive Imaging on Your Desktop" by Susan A. Kitchens, Peachpit Press, ISBN: 0-201-69684-3.

Quicktime VR—An Image based Approacjh to Virtual Environment Navigation, Shenchang Eric Chen, Apple Computer Inc., ACM-0-89791-701-4/95/008.

Primary Examiner—Mark Zimmerman
Assistant Examiner—Enrique L Santiago
(74) Attorney, Agent, or Firm—Fenwick & West LLP

(57) ABSTRACT

A surveillance system that includes a number of camera subsystems. Each camera subsystem includes a number of single lens cameras pointing in different directions which simultaneously capture images. Each camera subsystem covers a particular theater of interest. Each single lens camera captures an image of a particular region in a particular theater. When an object of interest is identified, the system can follow the object as it moves between regions and theaters in a facility. When an object is being followed, the system can provide a view of the object as it transitions between regions covered different single lens cameras in a particular camera subsystem and as it transitions between theaters covered by different camera subsystems.

22 Claims, 11 Drawing Sheets

U.S. PATENT DOCUMENTS

| | | |
|---|---|---|
| 5,729,471 A | 3/1998 | Jain |
| 5,748,121 A | 5/1998 | Romriell |
| 5,774,569 A | 6/1998 | Waldenmaier |
| 5,852,673 A | 12/1998 | Young |
| 5,872,575 A | 2/1999 | Segal |
| 5,886,745 A | 3/1999 | Muraji |
| 5,903,782 A | 5/1999 | Oxaal |
| 5,933,137 A | 8/1999 | Anderson |
| 5,936,630 A | 8/1999 | Oxaal |
| 5,990,934 A | 11/1999 | Nalwa |
| 6,002,430 A | 12/1999 | McCall et al. |
| 6,043,837 A | 3/2000 | Driscoll, Jr. et al. |
| 6,058,397 A | 5/2000 | Barrus et al. |
| 6,101,534 A | 8/2000 | Rothschild |
| 6,118,454 A | 9/2000 | Oxaal |
| 6,118,474 A * | 9/2000 | Nayar .................. 348/36 |
| 6,157,385 A | 12/2000 | Oxaal |
| 6,215,519 B1 | 4/2001 | Nayar et al. |
| 6,226,035 B1 | 5/2001 | Korein et al. |
| 6,237,647 B1 * | 5/2001 | Pong et al. ............. 141/94 |
| 6,243,099 B1 | 6/2001 | Oxaal |
| 6,252,603 B1 | 6/2001 | Oxaal |
| 6,271,853 B1 | 8/2001 | Oxaal |
| 6,323,858 B1 | 11/2001 | Gilbert |
| 6,323,862 B1 | 11/2001 | Oxaal |
| 6,337,683 B1 | 1/2002 | Gilbert |
| 6,346,950 B1 | 2/2002 | Jouppi |

* cited by examiner

SECURITY CAMERA SYSTEM FOR TRACKING MOVING OBJECTS IN BOTH FORWARD AND REVERSE DIRECTIONS

RELATED APPLICATIONS

This application is a non-provisional application of provisional application serial No. 60/381,444 filed May 17, 2002.

This application is also a continuation in part of the following applications.

a) Co-pending application Ser. No. 10/003,399 filed Oct. 22, 2001 entitled "Panoramic Movies which Simulate Movement Through Multi-dimensional Space" which is a continuation of application Ser. No. 09/310,715 filed May 12, 1999 which is now U.S. Pat. No. 6,337,683 b) Co-pending application Ser. No. 10/136,659 filed Apr. 30, 2002 entitled "Camera System With High Resolution Image Inside a Wide Angle View" which is a non-provisional application based upon provisional application No. 60/343,405 filed Nov. 19, 2001 and which is a continuation in part of applications.

1) Co-pending application Ser. No. 09/992,090 filed Nov. 16, 2001 entitled "Camera System With High Resolution Image Inside a Wide Angle View"

2) Co-pending application Ser. No. 09/994,081, filed Nov. 23, 2001 entitled "Camera System With High Resolution Image Inside a Wide Angle View"

Priority of the above applications is claimed and the content of their specifications is hereby incorporated herein by reference.

FIELD OF THE INVENTION

The present invention is related to digital camera systems and more particularly to digital surveillance camera systems.

BACKGROUND OF THE INVENTION

U.S. Pat. No. 6,323,858 describes a camera system which includes a plurality of single lens cameras positioned on the faces of a cube. The single lens cameras simultaneously capture images that can be seamed into a panoramic image. One can then select a view window into the panorama and display a portion of the panorama on a monitor.

U.S. Pat. No. 6,337,683 describes a system for linking a plurality of images into a panoramic movie. A panoramic movie sequentially displays a view window into a series of panoramic images. With a "regular movie" the image which is presented to a viewer is fixed. With a panoramic movie, a viewer can select a particular direction of view and a view window showing that direction of view will be presented to the viewer.

Co-pending application Ser. No. 10/136,659 shows a camera system which includes a plurality of wide angle single view cameras which capture a wide angle view of a theater of operations and a moveable high resolution single lens camera which captures a selected area in the theater under surveillance.

SUMMARY OF THE PRESENT INVENTION

The present invention provides a surveillance system that includes a number of camera subsystems. Each camera subsystem includes a number of single lens cameras pointing in different directions which simultaneously capture images. The captured images together cover some portion of the entire scene.

In general, the term facility is used to describe the entire area that is covered by the entire surveillance system. A facility covered by a surveillance system could, for example, be an airport terminal, it could be an entire shopping mall, it could be a large office building, etc. The term theater is used to describe the area covered by a particular camera subsystem, the term region is used to describe the area captured a particular single view camera, and the term display area is used to describe the portion of a theater displayed to an operator.

Each camera subsystem covers a particular theater of interest. Each single lens camera captures an image of a particular region in a particular theater. The system includes multiple camera subsystems located at different positions in a facility. The theaters covered by the subsystems have overlapping areas so that a person or object moving between theaters is continuously under surveillance. The camera subsystems are preferably located so that they cover entrance and exit points to both the facility and to parts of the facility.

The images captured by all the camera subsystems are made available to a central computer system. An operator can select a particular display area for viewing at a particular time. The area selected for display by an operator can be located in a region covered by one single lens camera, in one camera subsystem or it can be an area which has parts of regions covered by different single lens cameras which are part of a particular camera subsystem.

When an object of interest is identified, the system can follow the object as it moves between theaters in a facility. When an object is being followed, the system can provide a view of the object as it transitions between regions covered different single lens cameras in a particular camera subsystem and as it transitions between theaters covered by different camera subsystems.

All images captured by all the cameras are stored in a central data bank and one or more operator terminals are connected to the data bank for viewing images captured by the cameras. A moving object can be tracked as it moves forward in time or the history of an object can be shown. That is, the system can provide a series of images in real time as they are captured showing how an object is moving through a facility. The system can also show the history of an object's prior motion. That is, an object can be viewed by tracking the object backward in time through the stored images.

DETAILED DESCRIPTION OF A PREFERRED EMBODIMENT

The preferred embodiment of the invention described herein is a surveillance system in an airport terminal building. In a facility such as an airport terminal, people are constantly moving from one part of the facility to other parts of the facility. When a suspicious person is identified, it is desirable to trace the person in a forward direction as the person moves between different parts of the facility. It is also desirable to trace the person's prior movement, that is, to trace the person in a reverse time direction. The first embodiment of the invention described herein provides a system that can trace a person's movements as the person moves between theaters covered by different camera subsystems. The system can also trace a person's movement backward in time. That is, when an operator focuses on an individual, the operator can trace movements by the individual backward in time to determine where the person originated and who the person has previously contacted. The system will be described relative to tracing the movement of a person; however, it should be understood that any moving object can be traced and that a moving person is merely an illustration of what can be traced. Any moving object can be identified as an object of interest and traced in the same way that a moving person is traced.

Figure 1A:
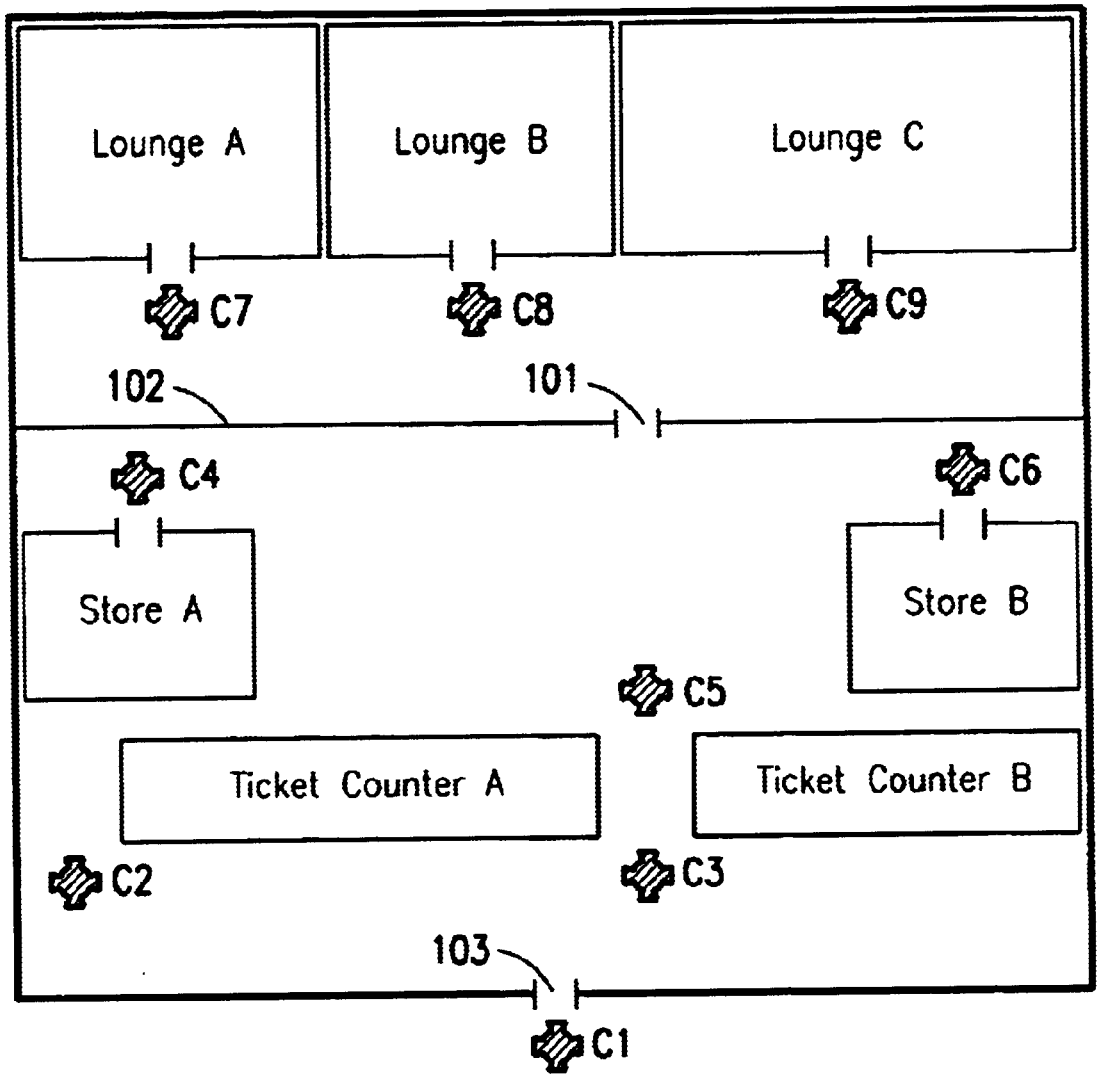
FIG. 1A is a diagram showing the locations of camera subsystem in a facility such as an airport terminal.

The images captured by all the cameras are stored. When a person of interest is identified, the movement of the person can be traced and viewed in both a forward and backward direction FIG. 1A illustrates an airport terminal facility. The terminal includes main entrance 103, ticket counter A, ticket counter B, merchandise shop A, merchandise shop B, a boarding lounge A, a boarding lounge B, a boarding lounge C. Security barrier 102 has an entrance 101. The locations of the entrances to the boarding areas and shops are illustrated by the short vertical lines. There are nine camera subsystems in the facility. The camera subsystems are designated C1 to C9. The camera subsystems cover overlapping theaters and they also cover the entrance and exit points of the facility in general and the entrance and exit points to different parts of the facility.

Figure 1B:
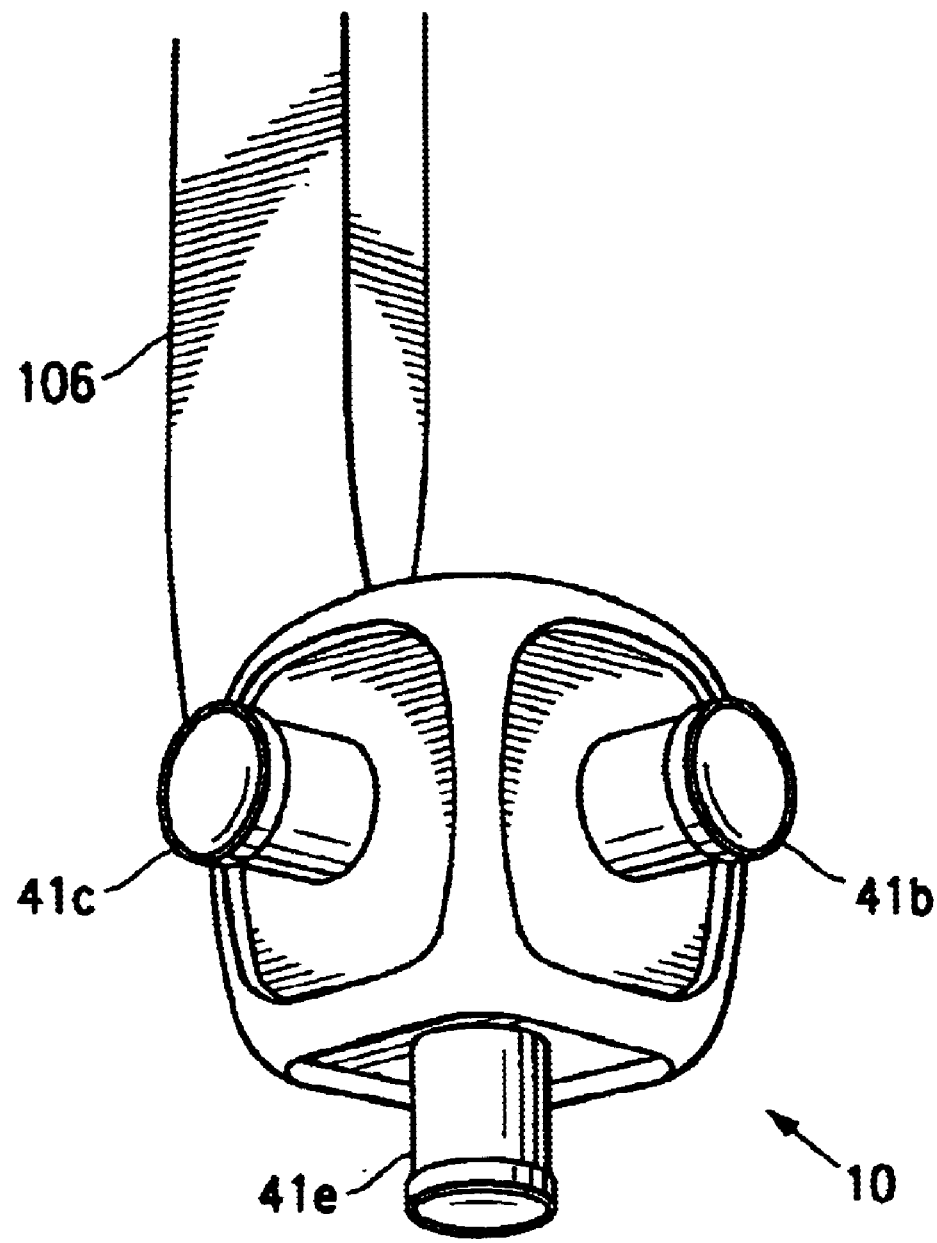
FIG. 1B is a diagram showing a camera subsystem camera lens assembly.

FIG. 1B shows the lens arrangement on a representative camera subsystem. The camera head includes a plurality of lenses positioned on the five faces (of the six faces) of a cube. Only three of the lenses 41b, 41c and 41e are visible in FIG. 1B. The other two lenses are on the faces opposite lenses 41b and 41c. Each camera subsystem captures five images, each image covers a particular region in the theater covered by that camera subsystem. For example, each single lens camera can have a 135 degree field of view. The combined 135 degree fields of view do not cover an entire sphere; however, the combined field of view does cover the regions of primary interest. The single lens cameras in each camera subsystem are simultaneously activated so that the images captured by all the single lens cameras in a particular camera subsystem represent the same period in time. It is best if the operation of all the single lens cameras in all the camera subsystems operate simultaneously, but this is not absolutely necessary. Likewise within each camera subsystem it is best if all the single lens cameras operate simultaneously, but this is not absolutely necessary.

In the preferred embodiment described, each camera subsystem has five lenses. In other embodiments some or all of the camera systems may have more or less than five lenses. Factors that influence the number of lenses used on each camera subsystem include, the desired resolution, the desired field of view, the cost etc. In the preferred embodiment each of the camera sub-systems C1 to C9 are identical; however, in other embodiments, some of the camera subsystems have different and/or special features.

The camera subsystems C1 to C9 can be similar to the cameras shown in issued U.S. Pat. No. 6,323,858. The camera shown in U.S. Pat. No. 6,323,858, has a six lenses facing out from all six faces of a cube. With the present invention, the camera head is suspended from the top of the facility via arm 106, hence, with this particular embodiment no lens is needed on the top of the cube.

Figure 2:
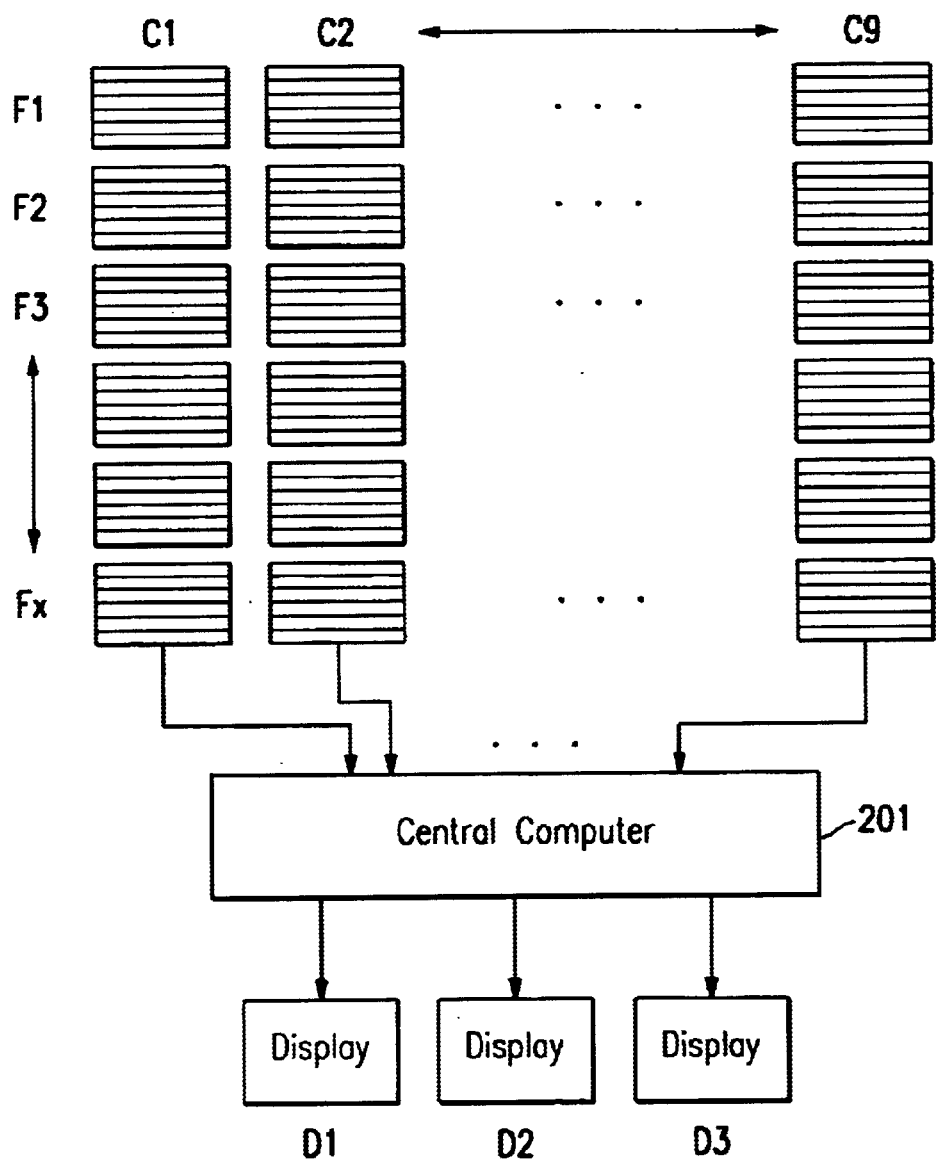
FIG. 2 is a system block diagram including a central computer system.

As shown in FIG. 2, each of the camera subsystems C1 to C9 provide a series of frames to a central computer 201. Each frame (such as the illustrated frames F1 to Fx) includes five images and a header. The header has metadata which identifies the camera which captured the image and the time the image was captured. The frames from each of the camera subsystems are stored at the central computer 201. A number of displays D1 to D3 are connected to the computer 201, either directly or over a network. The particular and selected display area from the captured images can be viewed on displays D1 to D3.

Each of the cameras in each subsystems C1 to C9 captures images of a different region (i.e. a different region in the theater covered by the camera subsystem). There is overlap in the regions covered by the single lens cameras in one camera subsystem. There is also overlap in the theaters covered by the various camera subsystems. For example the single lens camera pointing to the right on camera C2, captures an image covering some of the same region captured by the lens pointing left on camera C3.

Figure 3:
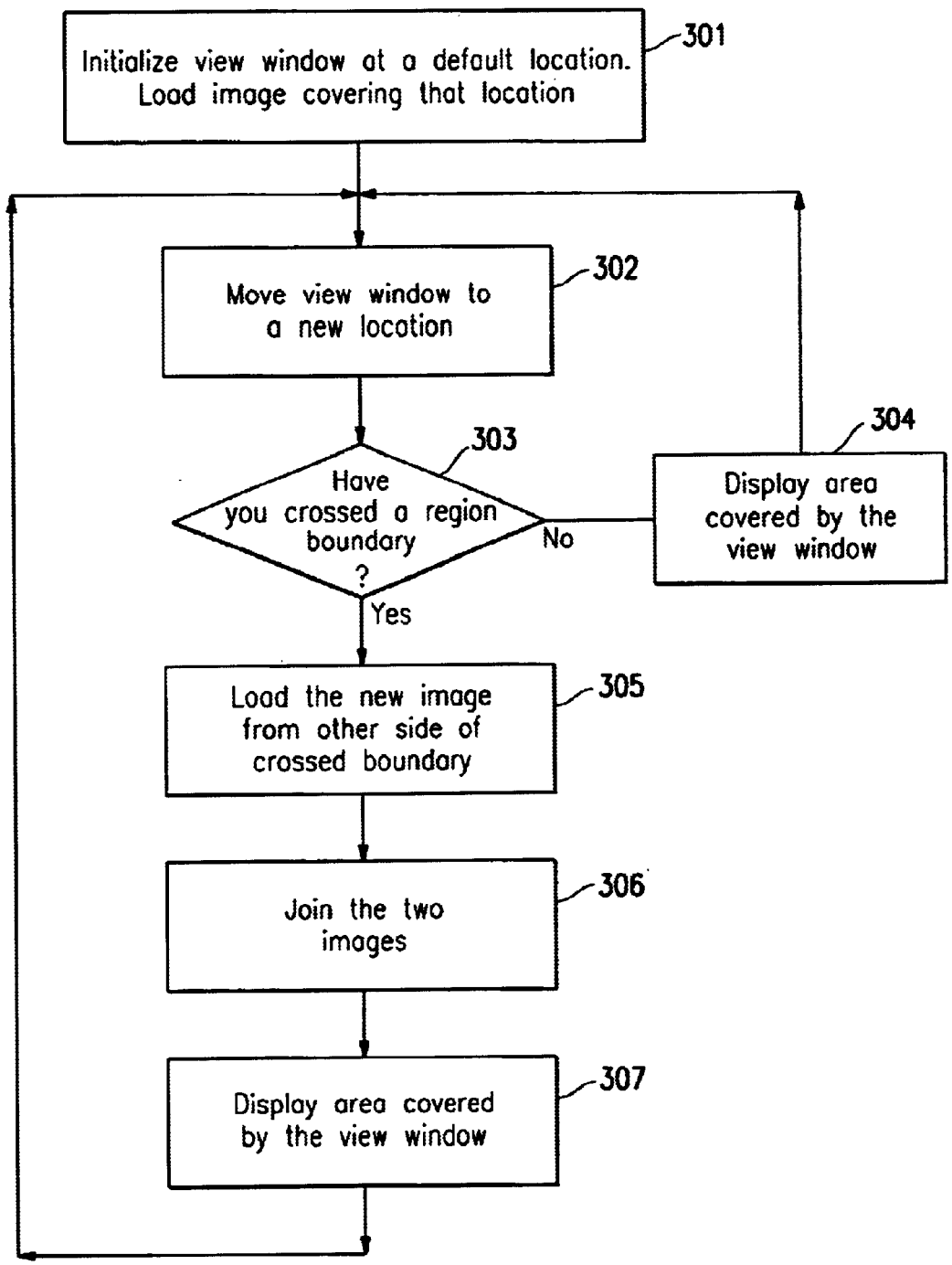
FIG. 3 is a program flow diagram showing how a moving object is followed as it moves within the views captured by one camera subsystem.
Figure 4:
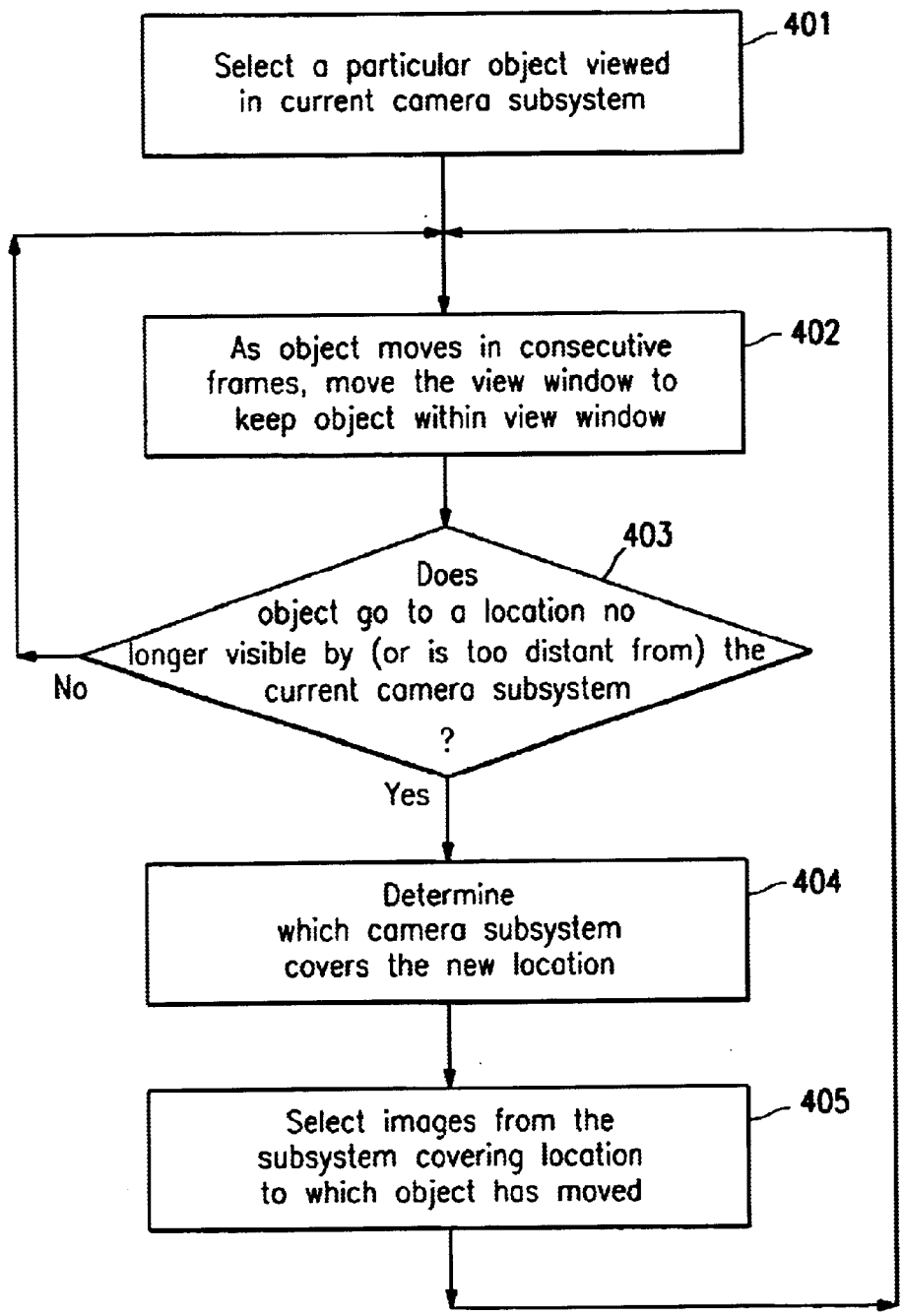
FIG. 4 is a program flow diagram showing how a moving object is followed as it moves between camera subsystems.

There are several modes of operation. FIG. 3 is a program flow diagram illustrating the operation of the system in a first mode of operation which only uses images from one camera subsystem. FIG. 4 is a program flow diagram illustrating the operation of the system in a second mode of operation. In the second mode of operation the display area crosses a boundary between the theater of one camera subsystem to the theater of a different camera subsystem. The system can automatically move between the modes of operation as required by the display areas which the operator or an automated scanner selects to view. That is, either an operator can select an area or an automated scanner can select an area.

In the first mode of operation (which only uses images captured by one camera subsystem and which is illustrated in FIG. 3), a user at one of the displays D1 to D3, selects a display area that the operator would like to observe. Each camera subsystem captures images which together cover at least a hemispheric panorama (one half of a sphere). An operator can select to view a display area (i.e. a view window) anywhere in this panorama. Note, the term "view window" is used relative to viewing panoramas, in order to be consistent with the terminology conventionally used relative to viewing panoramas.

Initially, the operator selects a camera subsystem and the operator is presented with a default view window from this camera subsystem. Using a mouse or some other control device, the operator can move the display area to a new location as indicated by block 302. As indicated by block 303, a check is made to determine if the new location has crossed a region boundary. That is, a check is made to determine whether the display area extends beyond the region covered by one single lens camera. Stated still another way, a check is made to determine whether the area covered by the view window covers both part of the region covered by a first single lens camera and part of the region covered by a different single lens camera in the same camera subsystem.

If a region boundary has not been crossed, the new area is displayed as indicated by block 304. If a region boundary has been crossed, the image from the other single lens camera is loaded, as indicated by block 305. The images are seamed as indicated by block 306 and the new view is displayed. In an alternate embodiment, the images from each single lens camera in each camera subsystem are seamed into a panorama prior to being stored for viewing. However, by only seaming the images needed for a desired view window, the amount of computational time required is decreased.

FIG. 4 shows a second mode of operation, tracking an object within and between camera subsystems. In the mode of operation illustrated in FIG. 4, a moving object is selected in the display area presented on one of the displays D1 to D3. The camera subsystem associated with the display containing the selected object is referred to in FIG. 4 as the current camera subsystem. Viewing consecutive frames of video, the view window then follows the motion of this moving object as illustrated by block 402. When the object moves to a point that it can no longer be seen by the current camera subsystem or is becoming very distant from the current camera subsystem (or would be better seen by another camera subsystem), the system determines which other camera subsystem would have a better view of this object as indicated by block 404. This can be done by consulting a table which stores the identity of the camera subsystem that will capture an image of a moving object as it leaves the view of each camera subsystem in each direction. This camera becomes the current camera subsystem. The process of tracking the moving object then continues with this camera subsystem.

FIG. 4 may be used to describe two different types of object tracking. The first type is tracking the object forward in time, for example in real time. In this instance, the phrase "consecutive frames" in Box 402 in FIG. 4 refers to video frames captured in natural recording sequence, moving forward in time.

The second type of object tracking is tracking the object back in time, from archived frames. For example, if an operator observes a person entering boarding area A, the operator can trace the prior action of this individual back to the time the individual entered the terminal as observed by camera C1. In this case, the phrase "consecutive frames" in Box 402 in FIG. 4 refers to video frames captured in reverse order of natural recording sequence, i.e. moving backward in time.

An object of interest (i.e. a person of interest) which is designated for tracking can be identified in a wide variety of ways. The person of interest can be designated by an operator who is continuously monitoring a particular site, such as main entrance 103 or by an official that notices something peculiar about a particular individual. The person of interest can be identified by an external system such as by a system that detects facial profiles and compares them to profiles in a data bank. A person of interest can be randomly selected for tracking on order to understand the pattern of movement in the facility.

Tracking a person as the person moves between different regions covered by the different cameras in one subsystem or as a person moves between different theaters covered by different subsystems uses the same techniques. These techniques utilize a profile of a moving object which the system assembles. When a person of interest is identified the system begins to detect and record the object's attributes such as velocity, cyclical movement profile, estimated height, color distribution, etc. Known types of logic can detect a wide variety of characteristics of an object from a series of images of the object. The particular characteristics detected in order to build the profile depend upon the application and the amount of expense appropriate for the particular system. The system can better and more accurately track moving objects if the system detects and records a profile with a large number of characteristics. The size, color and velocity of a moving object are relatively easy characteristics to detect and measure. Technology and software to detect and calculate other types of characteristics of an object are also known in the art. Furthermore, as an object moves between multiple different regions the profile of recorded characteristics can continue to expand and be refined. For example, both front and back profiles can be recorded.

As explained above, in some embodiments, the operation of all the single lens cameras in all the camera subsystems is synchronized. That is, all the cameras capture images at the precise same instant. This facilitates tracking in that the pattern of motion of a particular object can be identified in images from different camera. If one looks at a moving picture of a group of people walking, the up and down motion of the people in the group is not synchronized. If two synchronized movie cameras record a particular group of people, the images from both cameras can be compared to identify the same pattern of up and down movement, and thus the same individual in both groups. Such a comparison of images can be done by known technology.

Figure 5:
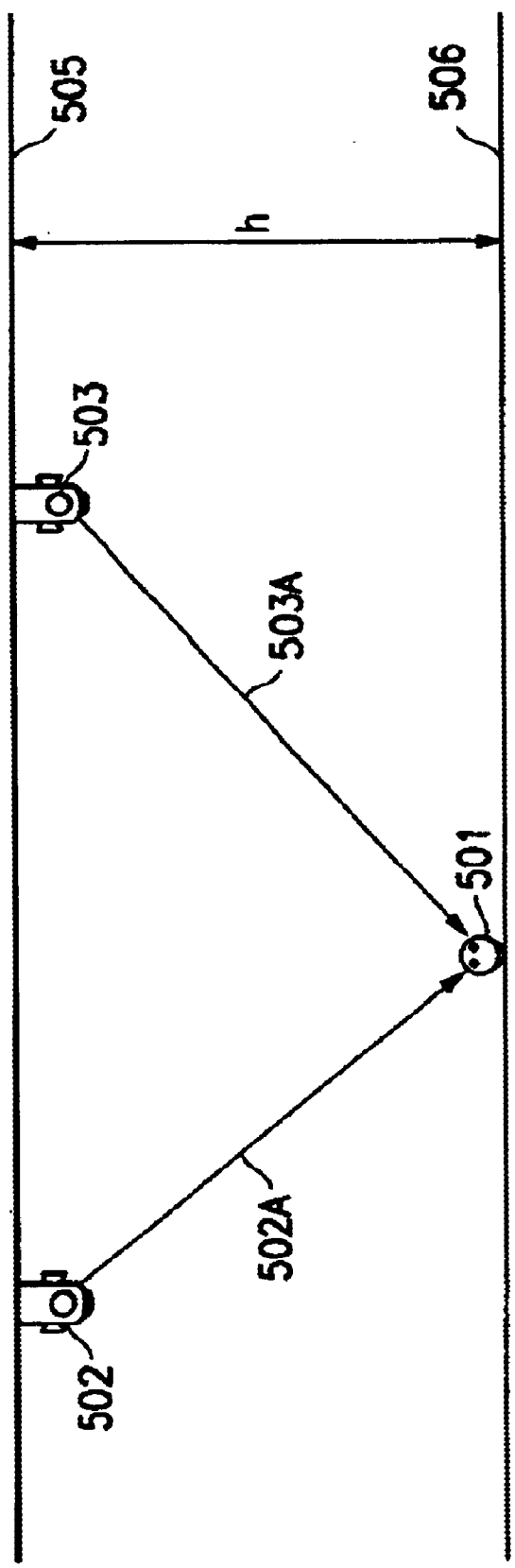
FIG. 5 shows how an object can be identified in space.

Another important factor in tracking a person as the person moves from one region to another or from one theater to another is the precise location of the person at a particular moment when it is in the two images captured by two cameras. FIG. 5 illustrates an object 501 which can be seen by two single cameras 502 and 503. Cameras 502 and 503 are in different camera subsystems. The cameras are attached to a ceiling 505 and the base of the object 506 is on the floor, hence, the height "h" is known. If the camera is moving from the region covered by camera 502 to the region covered by camera 503, the angle 502A is known, the distance between the cameras is known, hence, the angle 503A can be calculated. Thus from the location of the object 501 in the image from camera 502, the location of the object in the image from camera 503 can be calculated.

Figure 6:
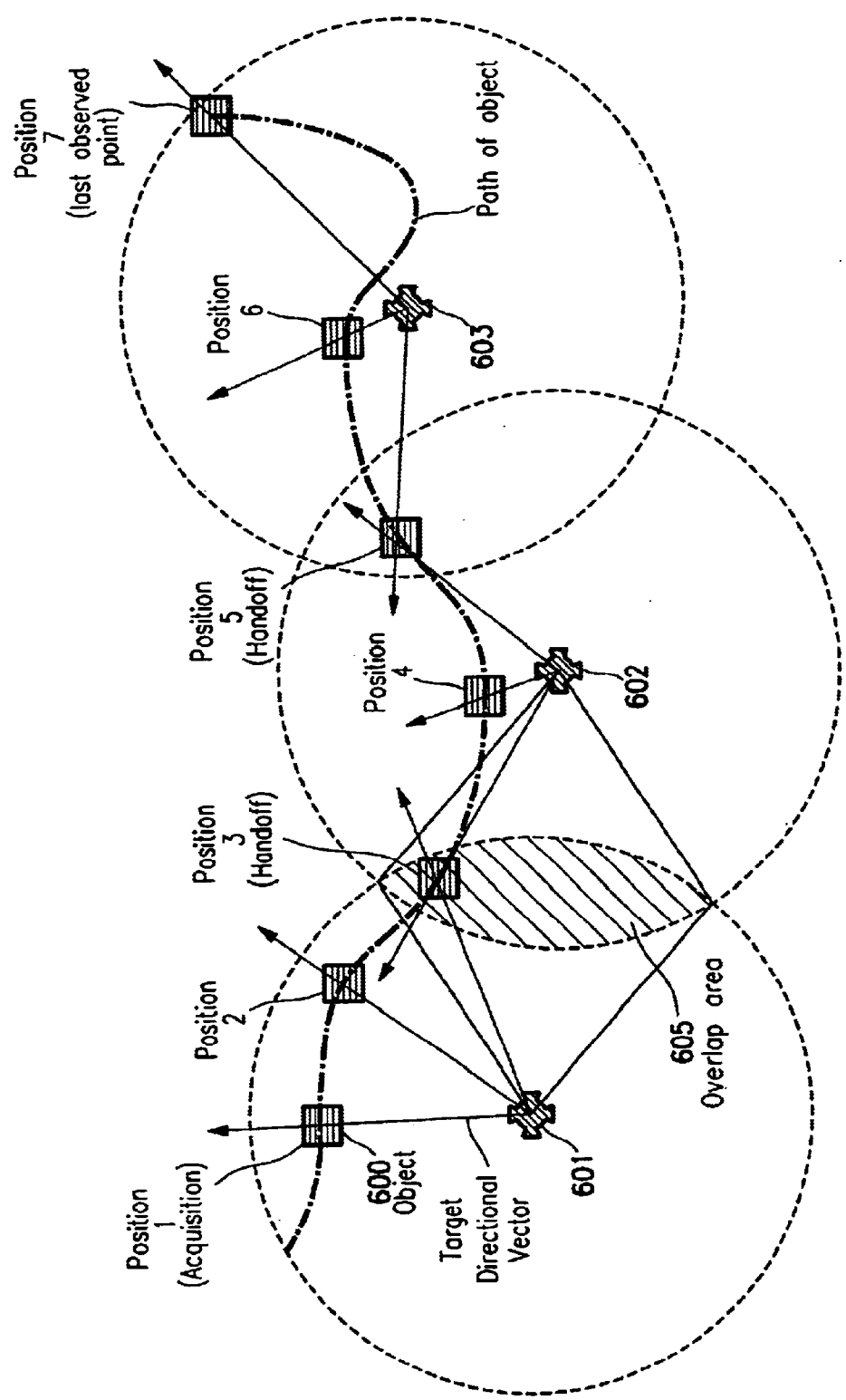
FIG. 6 shows an object moving between camera subsystems.

FIG. 6 illustrates how an object 600 is tracked as it moves between theaters covered by different camera subsystems. The tracking begins with camera 601. The object is detected and the system begins to detect and record the object's attributes such as velocity, cyclical movement profile, estimated height, etc.

As shown in FIG. 6, the object 600 is tracked by camera subsystem 601 as it moves from position 1, to position 2 and to position 3. At position 3, the object is also in the theater of camera subsystem 602. The system knows that the object moved out of the theater covered by camera subsystem 601 at a particular point. This tells the system that the object is now in the theater of camera subsystem 602. Camera Subsystem 602 detects the object using the profile assembled by camera 601. The profile is used to insure that the correct object is being tracked. The process continues when the object moves to position 5 where the tracking is handed off to camera subsystem 603. It is noted that while only three camera subsystems are shown in FIG. 6, the same operations can be expanded to any number of camera subsystems.

Figure 7:
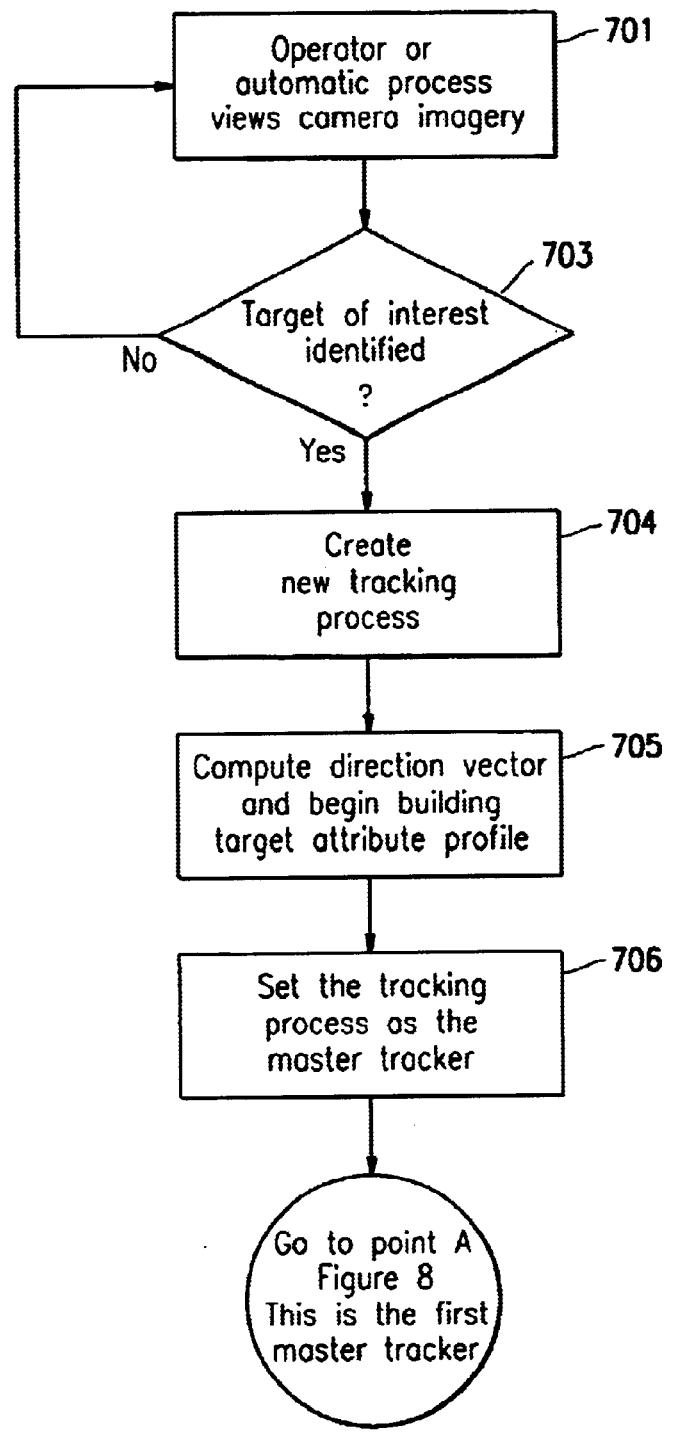
FIG. 7 is a program flow diagram of the process of detecting a target and building an attribute profile.
Figure 8:
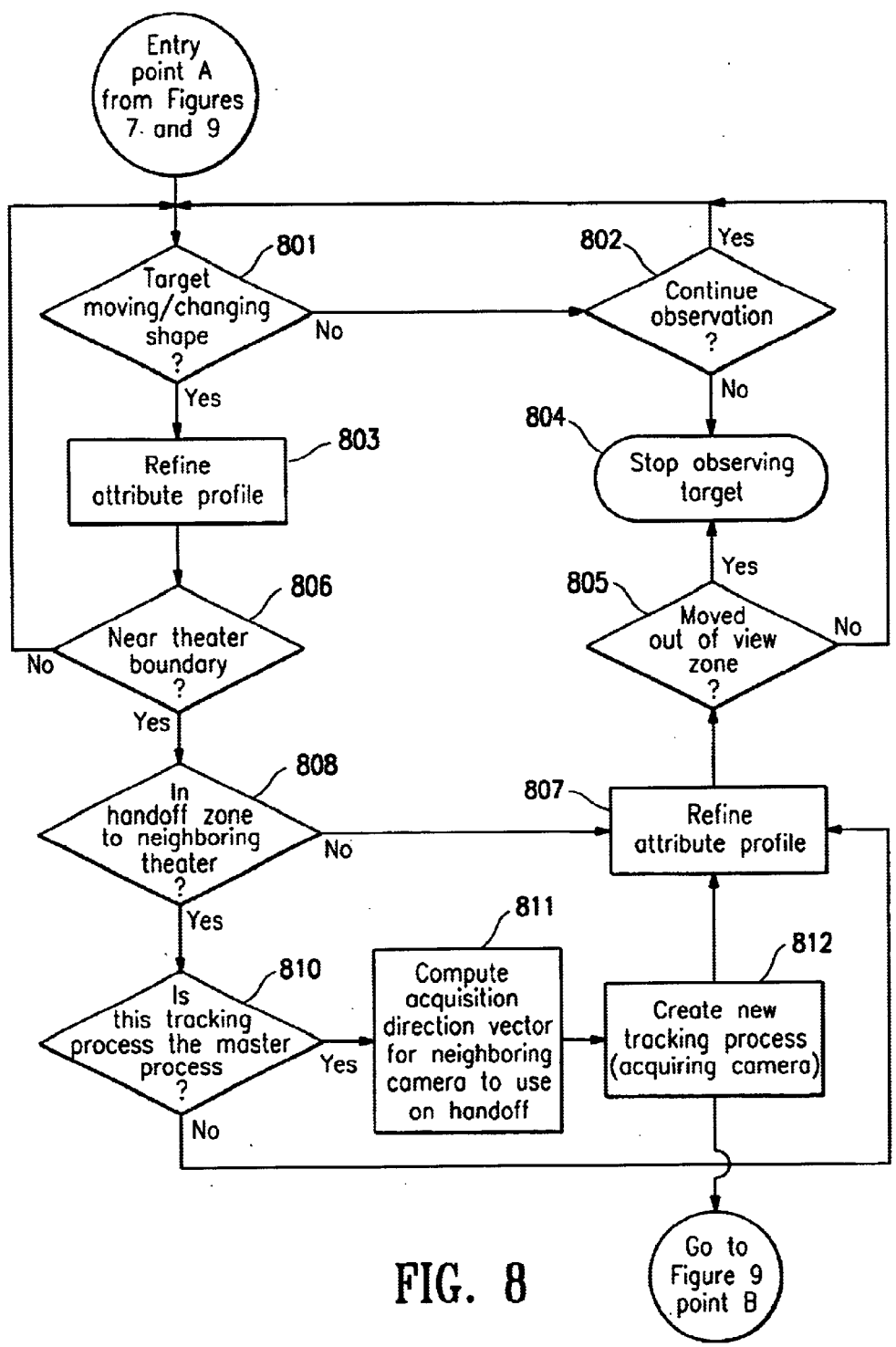
FIG. 8 is a program flow diagram of a program for tracking an object.
Figure 9:
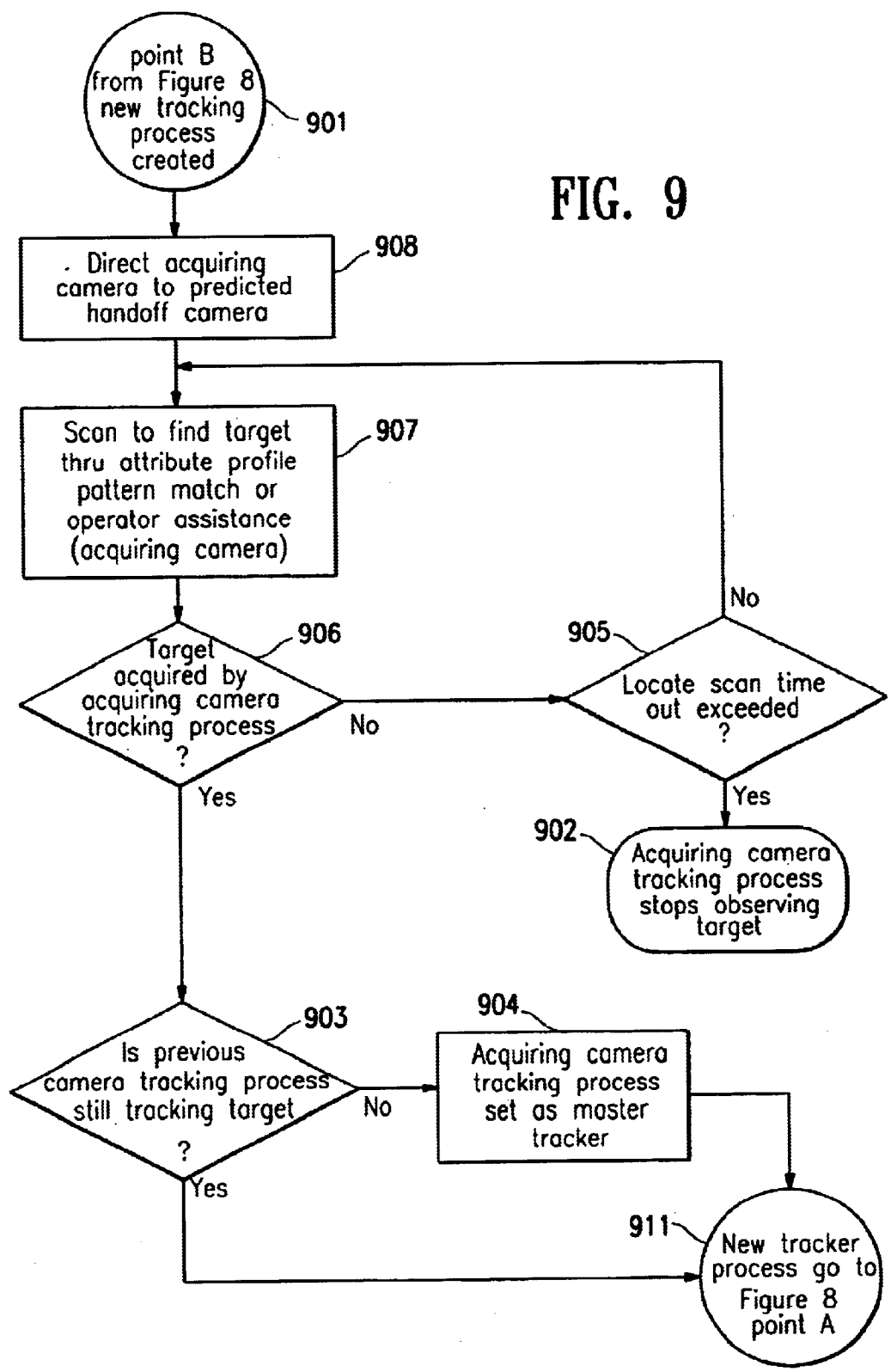
FIG. 9 is a program flow diagram of the program that establishes tracks.

FIGS. 7, 8 and 9 are program flow diagrams of the program that does the object tracking. FIG. 7 relates to initially selecting an object for tracking. The process begins with the steps shown in FIG. 7. FIG. 8 is a block diagram of the main tracking process. FIG. 8 illustrates how attributes are recorded and the operations that take place when the object gets into a theater boundary where it is ready for hand-off to a different Camera subsystem. FIG. 9 shows how tracking is handed off from one camera subsystem to another camera subsystem.

Each of the flow diagrams given in FIGS. 7, 8 and 9 will now be explained in more detail. As indicated by block 701, the tracking process begins when an object is selected for tracking. The selection can be done manually by an operator who points to a particular person on a screen and then clicks a mouse. Alternatively the selection can be by an automated detector which selects an object for tracking based on certain characteristics. However, in one of these ways if a target of interest is identified to block 703, a new tracking process is initiated as indicated by block 704. The system computes the direction vector from the camera subsystem to the object and the process of building a data base of the object's attributes begins. As explained above, the number of attributes measured depends upon the particular application. The first tracking process is set as the Master tracking process as indicated by block 706. It is noted that in the area where an object is in the theater of two camera subsystems, there can be a master tracking process proceeding from the subsystem that started the process and a secondary tracking process from the camera subsystem to which the object is moving. Once the object is only being tracked by the second camera subsystem, that tracking process becomes the master tracking process.

The process continues from the bottom of FIG. 7 to the process shown in FIG. 8. FIG. 8 shows the common tracking logic that operates for all tracking processes in operation. As indicated by block 801 the first check made is to determine if the object is still moving (i.e. does it change position between image frames). If the object is moving the attribute profile is refined to reflect the motion as indicated by block 803. Next as indicated by block 806, a check is made to determine if the object is near a boundary of the theater covered by the camera subsystem that is tracking the object. Next the system determines if the object is moving into a theater covered by another camera subsystem. It is possible that in some situations, not all areas are covered by a camera subsystem.

Blocks 808, 810, 811, 812 and 807 determine if a tracking process should be started in an adjacent camera subsystem. It is noted that even if a new tracking process is initiated by block 812, the master tracking process proceeds until block 805 indicates that the object has moved out of the theater of the camera subsystem that started the master tracking process and that process is terminated as indicated by block 804. Thus block 812 both continues the tracking process via block 807 and it creates a new tracking process via the logic shown in FIG. 9. The process can also be terminated if the object stops moving and either the operator determines to stop the process or a timeout occurs. This test is shown by block 802. The decision block 802 indicates that the process does not continue if either one of two things happened: either a time out occurred or the operator has made a decision to terminate the process.

FIG. 9 illustrates what happens when block 812 begins a new tracking process. The operations in FIG. 9 begin at point 901 when block 812 (see FIG. 8) begins a new tracking process. Block 908 indicates that the camera subsystem which is "acquiring" the object is directed to the area where the object is entering its theater. This means that the system begins looking for the object in the image that covers that particular region of the theater. As indicated by block 907, the image is scanned to locate the target. The location of the object in an image can for example be initially estimated by considering the geometry as indicated in FIG. 5. Next, other characteristics of the object can be checked to insure that the correct object has been identified. That is, the target is identified by looking for objects which have the attributes specified in the attribute profile.

Alternatively an operator can visually locate the target. Block 906 is a test to determine if the object has been acquired. A time limit is set tested in blocks 905 and target observation terminates at block 902 if a preset time limit is exceeded. Block 903 is a check to determine if the previous camera is still tracking the object. If the object is still in the theater of the previous camera the result of this check will be "yes" and the new tracker process then proceeds to the logic in FIG. 8; however, since the previous camera is still tracking the object, this will not be a Master tracking process. If the test at block 903 yields a "no" result, the process also proceeds to the logic in FIG. 8 as indicated by circle 911; however, in this situation the process will be the master tracking process.

The above tracking process is described relative to tracking a moving object as it moves from a theater covered by one camera subsystem to a theater covered by a different camera subsystem. The same process can be used to track an object as it moves between regions captured by different single lens cameras in the same camera subsystem. However, it is noted that the technology for tracking an object as it moves within the region presented by a single lens camera is well known. Thus, within each camera subsystem, the images may merely be seamed as an object moves from the edge of one region into another region and normal tracking algorithms may be employed to track the object as if there was only one image. This is termed on-the-fly seaming. In other embodiments, the images from the various single lens cameras in each camera subsystem may be first seamed into a panorama, and then the tracking within a subsystem can be over a continuous panoramic image.

It is noted that as described above, the tracking is done by cameras which acquire images which are then analyzed to detect objects. In alternate embodiments, the cameras could be replaced by other type of sensors. That is, for example instead of having a number of camera subsystems, one could have a number of acoustical, infrared, or radar detectors. Any type of sensor that can determine the attributes of a moving object can be used to implement the system in alternate embodiments.

The tracking process, and the object profiles that track objects as they move across boundaries, must take into account the fact that as an object moves across a theater boundary, the view from one camera will be a front view and the view from the other camera may be a side or back view. Thus, the profiles must consider factors such as height or width of an object which are invariant from front to back. Furthermore, the physical location of an object, i.e. its x and y position, is generally used as a primary identification criterion, and other factors are used to verify that the correct object is being tracked. Where there is doubt about the identity of an object as it moves across a boundary, the operator is notified.

Tracking moving objects is a relatively computationally intensive process. In order to take full advantage of all the computational power available in the computers that are part of a surveillance system, when an object of interest is identified, the system will normally begin to track an object's forward motion (unless the operator specifically decides to operate in another fashion). However, while the object is being tracked in the forward direction, any available excess computer power can be used to begin tracking the object in the reverse direction. The results of the reverse tracking is stored for later use. In this way if an operator at a later time asks the system to track the object in the reverse direction, the results will immediately be available.

Figure 10:
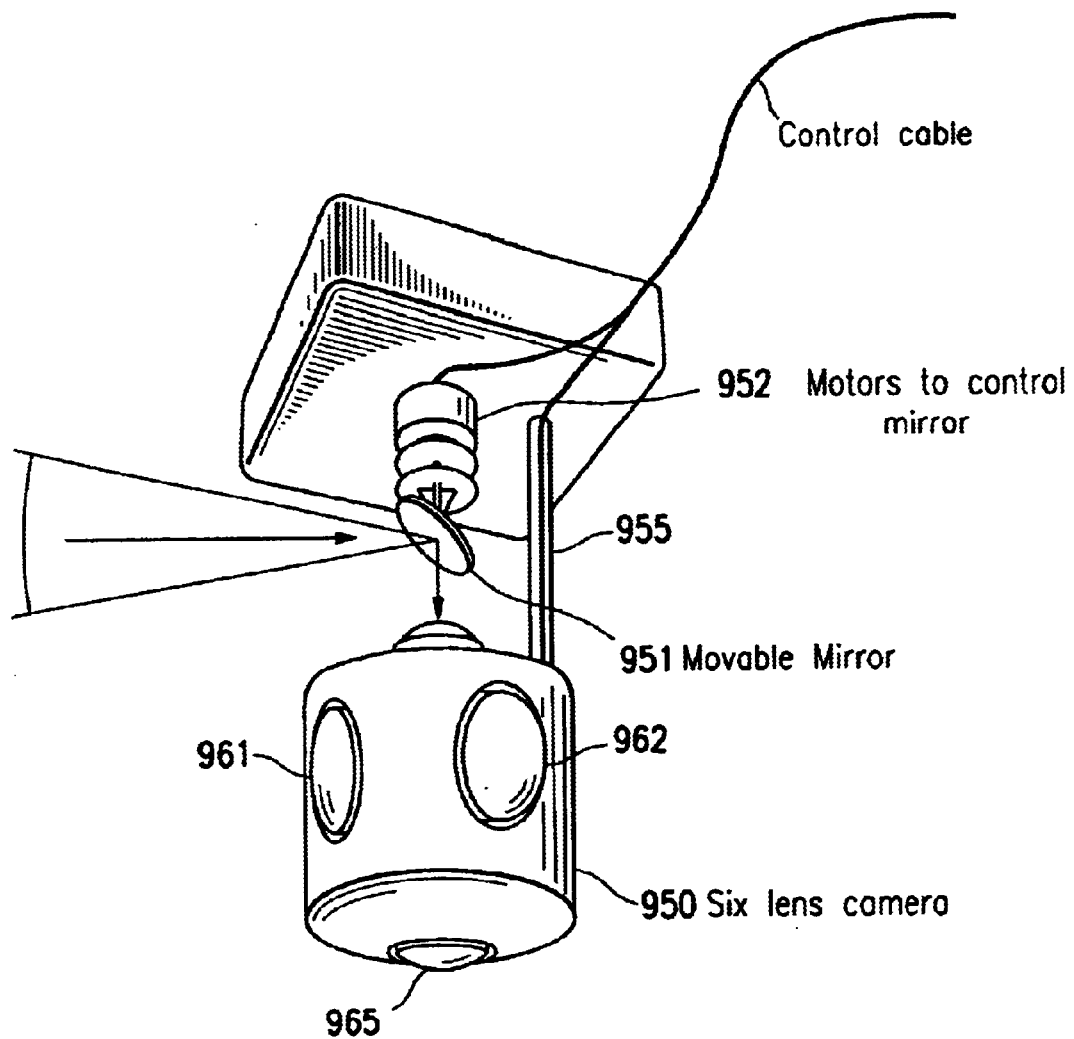
FIG. 10 shows an alternate embodiment of the invention.

FIG. 10 is a diagram of another embodiment of the invention. In this alternate embodiment at least one of the camera subsystems in the system has a high resolution (i.e. narrower field of view) single lens camera that can be directed to specific an region of particular interest. As illustrated in FIG. 10, a high resolution lens is pointed at a mirror 951 and the region captured by this camera is controlled by moving the mirror 951 using motor controls 952. That is, by moving the mirror 951, the single lens camera (which faces up from the top of the unit) can be directed to capture a high resolution image of a selected area. The camera subsystem 950 shown in FIG. 10 is a camera of the general type shown in co-pending application Ser. No. 10/136,659 filed Apr. 30, 2002, the content of which is hereby incorporated herein by reference. As used in the embodiment described here, the camera has an orientation that is different from the camera shown in the referenced co-pending application; however, the operation is similar.

The camera subsystem 950 is suspended from the ceiling of a facility by bracket 955. The subsystem has six single lens cameras. FIG. 10 shows lens 961 and 962 on the sides of structure, lens 965 at the bottom of the structure, and the lens of the high resolution camera at the top of the structure. Two additional lenses (not visible in FIG. 10) are on the sides opposite lenses 961 and 962. The orientation of mirror 951 is controlled by computer controlled motors 952. The details of how the mirror 951 can be controlled in order to direct the high resolution camera to particular region is described in the above referenced co-pending application. The high resolution image can be displayed either integrated with the display of the wide angle images or it can be shown on a separate display as described in the above referenced co-pending patent applications.

When the high resolution camera is directed to a moving object (for example an individual) that object is traced by the high resolution camera in a manner similar to that explained with reference to FIGS. 6 to 9. Thus, not only is the object tracked as it moves between camera subsystems, but the operator is also presented with a high resolution image of the object. When the object moves to a theater covered by one camera subsystem with a high resolution camera into another theater covered by a different camera subsystem which has a high resolution camera, the high resolution camera in the acquiring camera subsystem is directed to the area where the object is located. Thus, an operator can continuously see a high resolution image of a moving object (except when it is obscured from the view of the high resolution by the main camera body), as the object moves between theaters covered by different camera subsystems.

It is noted that in the embodiment described above, each camera subsystem includes a plurality of single lens cameras. It should be understood that in other embodiments of the invention, each camera subsystem only includes one or two lenses. That is, the invention can be utilized with camera subsystems which include fewer single lens cameras that those shown in the above described embodiments. If each camera subsystem has only one wide angle, single lens camera, the need to seam images captured by the camera subsystem is eliminated.

In an alternate embodiment of the invention, the system includes two displays. Each display shows the images from a particular camera subsystem. The operator can selectively switch each display to any particular subsystem. In normal operation, the two displays would show images from adjacent camera subsystems. Under operator control the displays can be either in the form of a matrix of images from the individual single lens camera or they can be in the form of a view window into a panorama formed from the images from a particular camera subsystem. With this system the operator can either be in complete control of tracking an object as it moves from one camera subsystem to another camera subsystem, or the operator can merely verify that a program which tracks objects from one camera subsystem to another camera subsystem has correctly tracked an object across a theater or region boundary.

The embodiments described above track a person as the person moves about in a facility. It should be noted that the above or various other embodiments can be used to track any moving object. The tracking can be done in a facility such as an airport terminal, or it can be outside in an area covered by camera subsystems. As used herein the term facility means any area covered by camera subsystems.

It will be understood by those skilled in the art that a wide variety of changes in form and detail can be made without departing from the spirit and scope of the invention. The scope of the invention is limited only by the appended claims.

We claim:

1. A surveillance system for a facility, said system including a plurality of camera subsystems, each camera subsystem capturing images of a particular theater in said facility, some of said theaters having overlapping areas, each camera subsystem including a plurality of single view cameras, each single view camera covering a particular region in a theater, said regions having overlapping areas, a computer system for storing images captured by said single view cameras, a program for tracking an object as it moves across region boundaries in a camera subsystem and for tracking an object as it moves across theater boundaries.

2. The system recited in claim 1 including a computer program for identifying characteristics of an object and for using those characteristics as the object moves across region or theater boundaries.

3. The system recited in claim 1 including a computer program for calculating the position of an object in one image and using said position to identify the same object in another image.

4. The system recited in claim 1 wherein each of said single view cameras capture images in synchronization so that objects can be more easily tracked across region or theater boundaries.

5. The system recited in claim 1 wherein said system maintains a table indicating which theaters will have a view of an object when the object moves out of a particular theater in a particular direction.

6. The system recited in claim 1 wherein said system maintains a table indicating which regions will have a view of an object when the object moves out of a particular region in a particular direction.

7. The system recited in claim 1, wherein portions of the panoramic images are seamed together in real time.

8. The system recited in claim 1, wherein the location of the tracked object in a first image captured by a first camera subsystem is used to determine the location of the tracked object in a second image captured by a second camera subsystem.

9. The system recited in claim 1, wherein the first and second images are high-resolution images.

10. The system recited in claim 3, wherein the attribute profile includes a velocity of the tracked object.

11. The system recited in claim 3, wherein the attribute profile includes a cyclical movement profile of the tracked object.

12. The system recited in claim 3, wherein the attribute profile is continuously refined as the tracked object moves through the environment.

13. A method of tracking a moving object using a surveillance system including a plurality of camera subsystems, each camera subsystem capturing images of a particular theater in an environment having multiple theaters, each camera subsystem including a plurality of single view cameras, each single view camera covering a particular region in a theater, the method comprising:

continuously tracking an object as it moves across region and theater boundaries; and generating panoramic images by seaming together single view images captured by the single view cameras, the panoramic images including single view images of the tracked object moving across region and theater boundaries.

14. A computer-readable medium having stored thereon instructions, which, when executed by a processor in a surveillance system including a plurality of camera subsystems for capturing images of a particular theater in an environment having multiple theaters, each camera subsystem including a plurality of single view cameras, and each single view camera covering a particular region in a theater, cause the processor to perform the operations of:

continuously tracking an object as it moves across region and theater boundaries; and generating panoramic images by seaming together single view images captured by the single view cameras, the panoramic images including single view images of the tracked object moving across region and theater boundaries.

15. A surveillance system, comprising:

a plurality of camera subsystems, each camera subsystem capturing images of a particular theater in an environment having multiple theaters, each camera subsystem including a plurality of single view cameras, each single view camera covering a particular region in a theater;

a rendering module for seaming together single view images into panoramic images; and a tracking module for tracking a moving object in a first panoramic image, identifying at least one attribute of the tracked object while it is being tracked in the first panoramic image, and tracking the moving object in a second panoramic image, wherein the attribute is used to distinguish between the tracked object and other objects in the second panoramic image.

16. The system of claim 15, further comprising:

a storage device for storing the panoramic images to facilitate tracking of the object backward in time.

17. The system of claim 15, wherein the attribute is velocity of the tracked object.

18. The system of claim 15, wherein the attribute is a cyclical movement profile of the tracked object.

19. The system of claim 15, wherein the attribute is continuously refined as the object moves through the environment.

20. A method of tracking a moving object in a series of panoramic images, comprising:

tracking a moving object in a first panoramic image;

identifying at least one attribute of the tracked object while it is being tracked in the first panoramic image; and tracking the moving object in a second panoramic image, wherein the attribute is used to distinguish between the tracked object and the other objects in the second panoramic image.

21. A computer-readable medium having stored thereon instructions, which, when executed by a processor in a surveillance system, cause the processor to perform the operations of:

tracking a moving object in first panoramic image;

identifying at least one attribute of the tracked object while it is being tracked in the first panoramic image; and tracking the moving object in a second panoramic image, wherein the attribute is used to distinguish between the tracked object and other objects in the second panoramic image.

22. The system of claim 15, wherein the attribute is at least one of a front and back profile of the tracked object.

* * * * *

UNITED STATES PATENT AND TRADEMARK OFFICE
CERTIFICATE OF CORRECTION

PATENT NO.    : 6,690,374 B2
DATED         : February 10, 2004
INVENTOR(S)   : Michael C. Park et al.

It is certified that error appears in the above-identified patent and that said Letters Patent is hereby corrected as shown below:

Title page,
Item [60], Related U.S. Application Data, please replace "60/381,445" with -- 60/381,444 --.

Column 10,
Lines 33-63, please replace Claims 1 through 6, in their entirety with
-- 1. A surveillance system comprising:
  a plurality of camera subsystems, each camera subsystem capturing images of a particular theater in an environment having multiple theaters, each camera subsystem including a plurality of single view cameras, each single view camera covering a particular region in a theater;
  a tracking module operatively coupled to the camera subsystems for continuously tracking an object as it moves across region and theater boundaries; and
  a rendering module operatively coupled to the tracking module for generating portions of panoramic images by seaming together single view images captured by the single view cameras, the panoramic images including single view images of the tracked object moving across region and theater boundaries.

2. The system recited in claim 1, further comprising:
  a storage device for storing the panoramic images to facilitate tracking the object backward in time.

3. The system recited in claim 1 wherein the system maintains an attribute profile for the tracked object to enable the camera subsystems to distinguish between the tracked object and other objects.

4. The system recited in claim 1 wherein at least two single view cameras capture images in synchronization to facilitate tracking objects across region or theater boundaries.

5. The system recited in claim 1 wherein the system maintains data indicating which theaters will have a view of the object when the object moves out of particular theater in a particular direction.

UNITED STATES PATENT AND TRADEMARK OFFICE
CERTIFICATE OF CORRECTION

PATENT NO. : 6,690,374 B2
DATED : February 10, 2004
INVENTOR(S) : Michael C. Park et al.

It is certified that error appears in the above-identified patent and that said Letters Patent is hereby corrected as shown below:

Column 10 (cont'd),

6. The system recited claim 1 wherein the system maintains data indicating which regions will have a view of the object when the object moves out of a particular region in a particular direction. --

Signed and Sealed this

Twentieth Day of July, 2004

JON W. DUDAS
*Acting Director of the United States Patent and Trademark Office*